US005710892A

United States Patent [19]
Goodnow et al.

[11] Patent Number: 5,710,892
[45] Date of Patent: Jan. 20, 1998

[54] SYSTEM AND METHOD FOR ASYNCHRONOUS DUAL BUS CONVERSION USING DOUBLE STATE MACHINES

[75] Inventors: Kenneth Joseph Goodnow, Essex Jct.; Dana John Thygesen, Huntington, both of Vt.

[73] Assignee: International Business Machines Corporation, Armonk, N.Y.

[21] Appl. No.: 504,347

[22] Filed: Jul. 19, 1995

[51] Int. Cl.$^6$ .............................. G06F 13/00; G06F 13/14
[52] U.S. Cl. .......................... 395/307; 395/308; 395/527; 326/46
[58] Field of Search ...................... 395/306, 307, 395/308, 527; 326/46

[56] References Cited

U.S. PATENT DOCUMENTS

| | | |
|---|---|---|
| 4,727,491 | 2/1988 | Culley . |
| 4,821,170 | 4/1989 | Bernick et al. . |
| 4,835,681 | 5/1989 | Culley . |
| 5,210,856 | 5/1993 | Auvinen et al. . |
| 5,228,045 | 7/1993 | Chiles ................................ 371/22.3 |
| 5,239,926 | 8/1993 | Nubson et al. . |
| 5,325,490 | 6/1994 | Brasseur . |
| 5,333,293 | 7/1994 | Bonella . |
| 5,339,395 | 8/1994 | Pickett et al. . |
| 5,341,508 | 8/1994 | Keeley et al. . |
| 5,386,518 | 1/1995 | Reagle et al. . |
| 5,555,381 | 9/1996 | Ludwig et al. ........................ 395/281 |
| 5,564,026 | 10/1996 | Auini et al. ........................ 395/308 |

*Primary Examiner*—Jack B. Harvey
*Assistant Examiner*—Jeffrey K. Seto
*Attorney, Agent, or Firm*—Whitham, Curtis, Whitham & McGinn; Mark F. Chadurjian

[57] ABSTRACT

A bus interface system and method for communication between different computer components having buses with different speeds, data widths, or protocols. A first state machine communicates with the first bus and a second state machine communicates with the second bus. Each of the buses communicates with a data storage device. The first and second state machines are in selective communication using an asynchronous handshaking protocol, whereby data is transferred between said first and second buses. The handshaking protocol comprises an asynchronous request signal from the first bus requesting a data transfer and an asynchronous reply signal from the second bus indicating that data has been sent or is available.

15 Claims, 4 Drawing Sheets

SYSTEM AND METHOD FOR ASYNCHRONOUS DUAL BUS CONVERSION USING DOUBLE STATE MACHINES

BACKGROUND OF THE INVENTION

1. Field of the Invention

The present invention generally relates to dissimilar bus interfaces, and, more particularly, to a technique that effectively couples new, faster microprocessors into existing systems without slowing the newer processor down to the original bus speed.

2. Description of the Related Art

In many computer systems the addition of new components or the upgrading of existing components necessitates communications between two different bus systems. For example, when adding a new product such as a processor upgrade card, the new processor must interface with the existing system bus. The existing bus may differ from the new processor's bus in either speed, data width, or protocol, or various combinations thereof.

A problem exists in that a new processor, running at 50 MHz for example, must interface with an existing bus, running at perhaps 10 MHz. Previous solutions to the problem can generally be divided into two techniques. One solution was to run the newer processor at 10 MHz to coincide with the existing bus system. However, this negates the speed advantage of having the new processor.

A second solution was to run the new processor at 50 MHz while sending the signals to the bus logic where they were slowed to 10 MHz. Although the new processor is able to run at 50 MHz, there was a lag between the time the older bus is able to finish processing the first processor signal and when it is ready to receive the second processor signal. Again, the speed advantage of the new processor is negated.

Also, in both solutions, the processor and system bus are synchronously connected through the bus translation logic. This requires that the processor wait for all the bus transactions to be converted from one bus to the other and responses to be converted back. While this is happening, the processor is essentially idle, hindering performance.

Synchronous buses have additional disadvantages. For one, every device on the bus must run at the same clock rate. Moreover, because of clock-skew problems, synchronous buses cannot be long if they are fast.

In light of the foregoing, there exists a need for a system and method to asynchronously interface dissimilar buses so as to minimize the impact on the performance of the system.

SUMMARY OF THE INVENTION

The present invention is directed to a system and method of asynchronous bus conversion using a dual state machine design, which substantially obviates one or more of the problems due to the limitations and disadvantages of the related art.

This invention involves the use of two standard state machines that asynchronously control two dissimilar buses. The first state machine controls the first bus, and is either a duplicate or an inverse of the state machine of a replaced processor or bus master, for example. The second state machine controls the second bus, and may be a duplicate or an inverse of the state machine of the replacing processor or bus master.

Data is passed between the two dissimilar busses by first storing the data in buffers or other data storage means. The handshake between the two state machines is accomplished by two asynchronous signals; Request and Ready. The Request signal signifies that the first bus has requested new data or wishes to send new data. The ready signal from the second bus's state machine signifies that the data has been taken or is available.

A significant advantage of the present invention is that since these two signals are asynchronous, the two state machines can operate independent of one another, allowing each state machine to run at a different clock rate. In addition, the circuit delay of the controlling logic of the first bus is masked by the bus delay of the second bus in most data transfer situations. This allows the use of traditional speed technology without having to employ special design tricks.

To achieve these and other advantages and in accordance with the purpose of the invention, as embodied and broadly described, the invention provides for a bus interface system in communication with first and second computer components, comprising a first bus associated with the first component, the first bus having a first characteristic speed, data width, and protocol; a second bus associated with the second component, the second bus having a second characteristic speed, data width, and protocol, wherein at least one of the second characteristics is different from the first characteristics; a first state machine communicating with the first bus; a second state machine communicating with the second bus; and data storage means associated with the first and second buses, the first and second state machines being in selective communication using an asynchronous handshaking protocol, whereby data is transferred between the first and second buses.

In another aspect, the invention provides for a method of asynchronous dual bus conversion using first and second state machines for a computer system having a first bus having a first characteristic speed, data width, and protocol, and a second bus having a second characteristic speed, data width, and protocol, wherein at least one of the second characteristics is different than the first characteristics, the method comprising the steps of: storing data to be transferred in a data storage means; initiating an asynchronous request signal by the first state machine in communication with the first bus, having a format comprising the first characteristics, thereby requesting that data in the data storage means be transferred; and initiating an asynchronous reply signal by the second state machine in communication with the second bus, having a format comprising the second characteristics, thereby signalling that the data has been sent or is available.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The system and method of the present invention may be utilized in any number of situations where two dissimilar buses must communicate within a system. A common situation would be where a new, faster processor card (upgrade card) replaces the existing slower processor, thereby requiring an interface between two dissimilar bus systems. The older and slower bus system may interface with an existing memory device for example. Another example would be where a new memory card is exchanged for an older one.

While the embodiment discussed below is directed to a processor upgrade, it is understood that the system and method of the present invention are applicable to any replacement, upgrading, or addition of computer components that gives rise to the need for communication between dissimilar bus interfaces.

Figure 1:
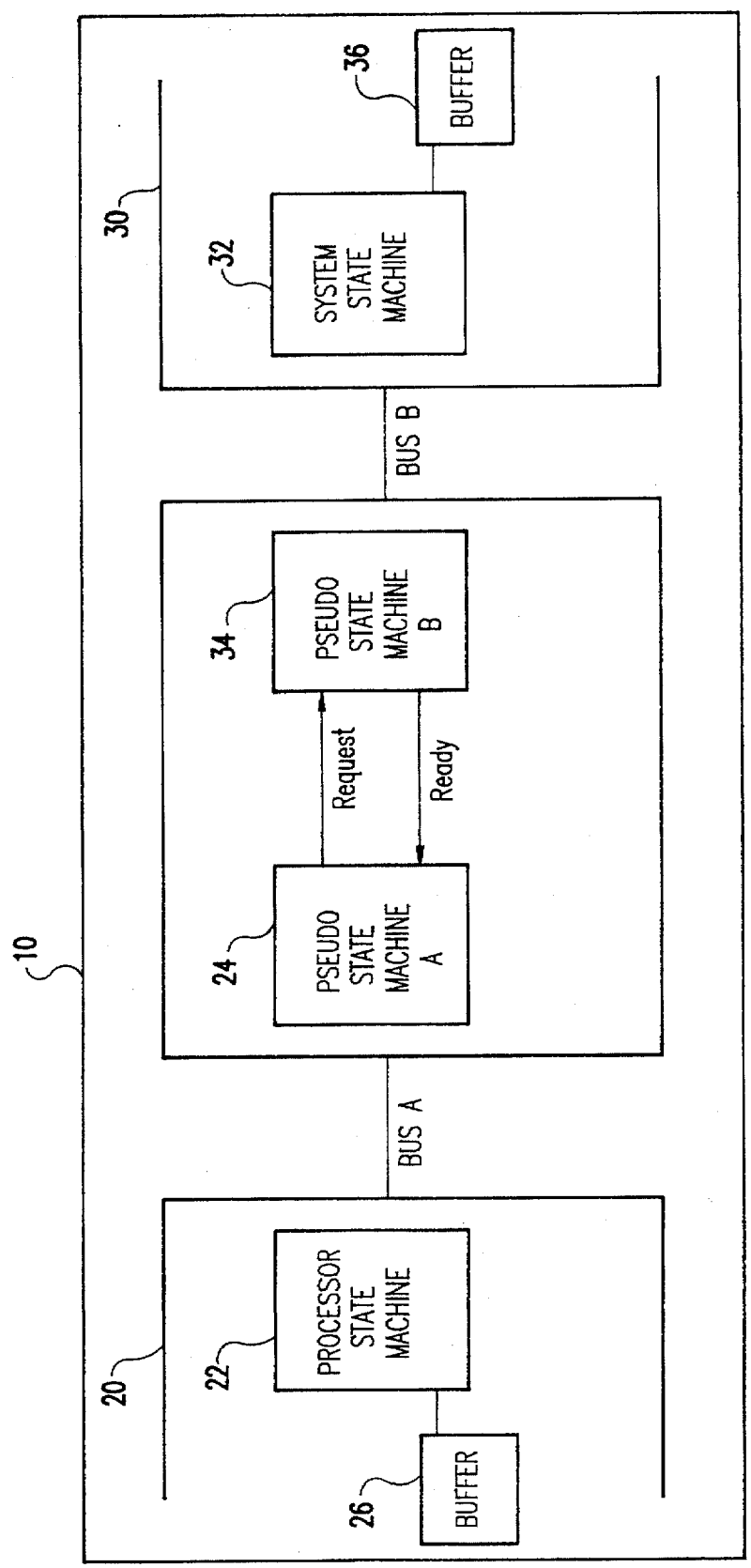
FIG. 1 is a diagrammatical representation of the components of a computer system that implement the process of the present invention.

In general, FIG. 1 illustrates an exemplary embodiment of a bus interface system 10 for which the present inventive method may be utilized. In the embodiment described below, we will assume that we are replacing an older 80386 (Intel Corporation) microprocessor, communicating with a 80386 system, with a 80486 (Intel Corporation) microprocessor communicating with the 80386 bus system.

In FIG. 1, bus A communicates with the new (80486) processor 20 and bus B communicates with the existing (80386) bus system 30. The processor 20 and system bus 30 may be represented by a processor state machine 22 and system state machine 32, respectively.

In the above example, buses A and B are dissimilar in that the speed, data widths, and protocols are different. Specifically, the speed of bus A is 33 MHz while the speed of bus B is 20 MHz. The data widths are 32 bits and 16 bits for buses A and B, respectively. Lastly, bus A uses a burst protocol (multiple data pieces for a single request) and bus B uses a single handshake protocol. It is understood that buses A and B need only be dissimilar in one respect in the practice of this invention.

In order to provide an interface between these dissimilar buses, and in accordance with the present invention, pseudo state machines A and B are provided. Pseudo state machine A (24) {hereinafter "state machine A"} communicates with processor 20 via bus A (i.e, the new 80486 bus system). Pseudo state machine B (34) {hereinafter "state machine B"} communicates with system bus 30 via bus B (i.e., the old 80386 system bus).

State machine A controls bus A and may be an "inverse or mirror" of the processor state machine 22 of the replacing processor or bus master. State machine B controls bus B and is typically a duplicate of the system state machine 32 of the replaced processor or bus master. The concept of an inverse or mirrored state machine versus a duplicate state machine is discussed in greater detail later in the specification. At this point, however, it is understood that either or both of state machines A and B can be, but need not be, mirrored state machines in the practice of this invention.

As shown in FIG. 1, state machines A and B communicate using two asynchronous handshake protocol signals "Request" and "Ready". In actual operations, the data to be passed between the two buses is first stored in respective buffers 26 and 36. The data buffers may be implemented by any conventional means. For example, the data may be stored in a First-In, First-Out (FIFO) memory or a two ported memory configured as a circular buffer.

Figure 2:
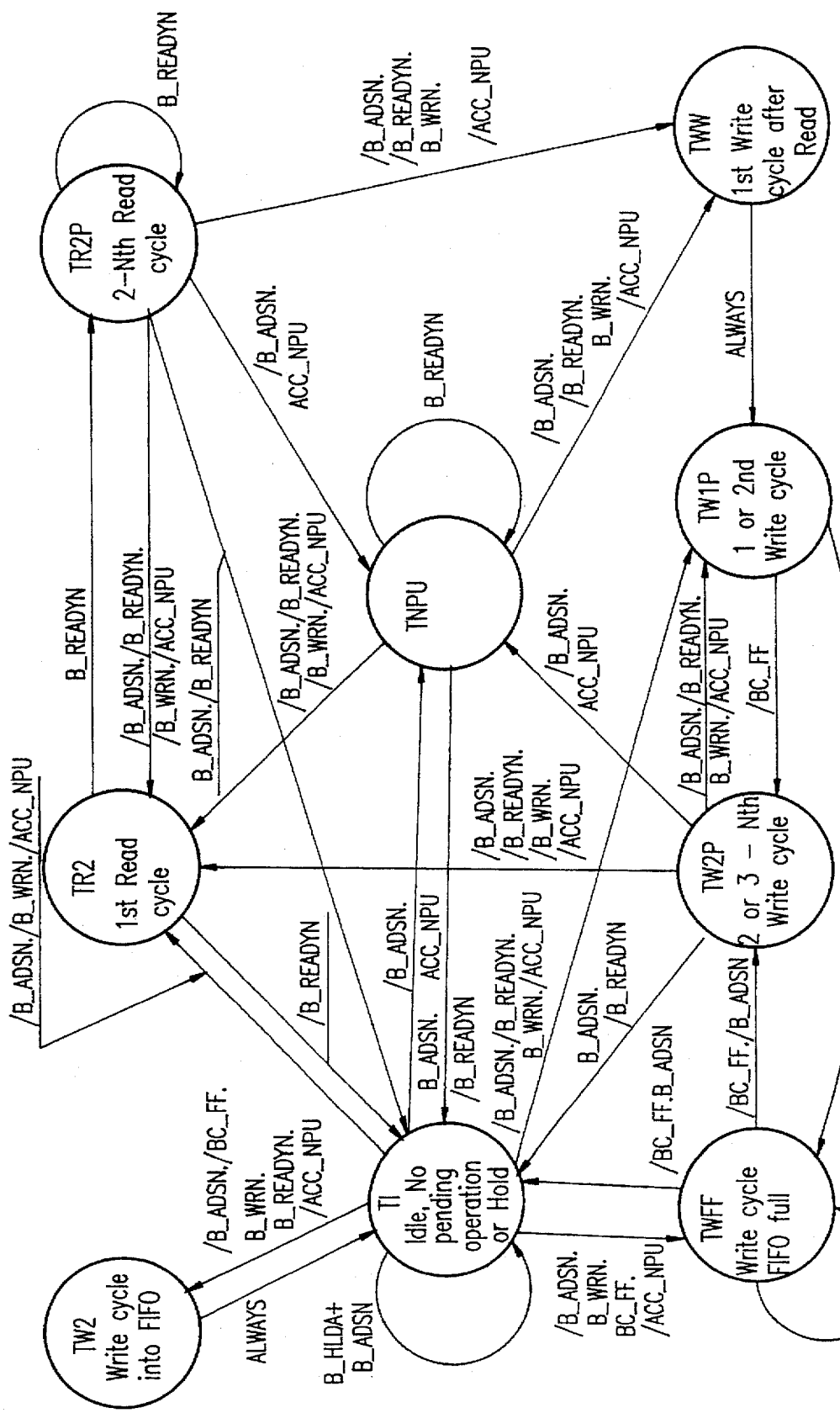
FIG. 2 is a diagrammatical representation of the state diagram of a mirror of a replacing processor usable with the process of the present invention.
Figure 3:
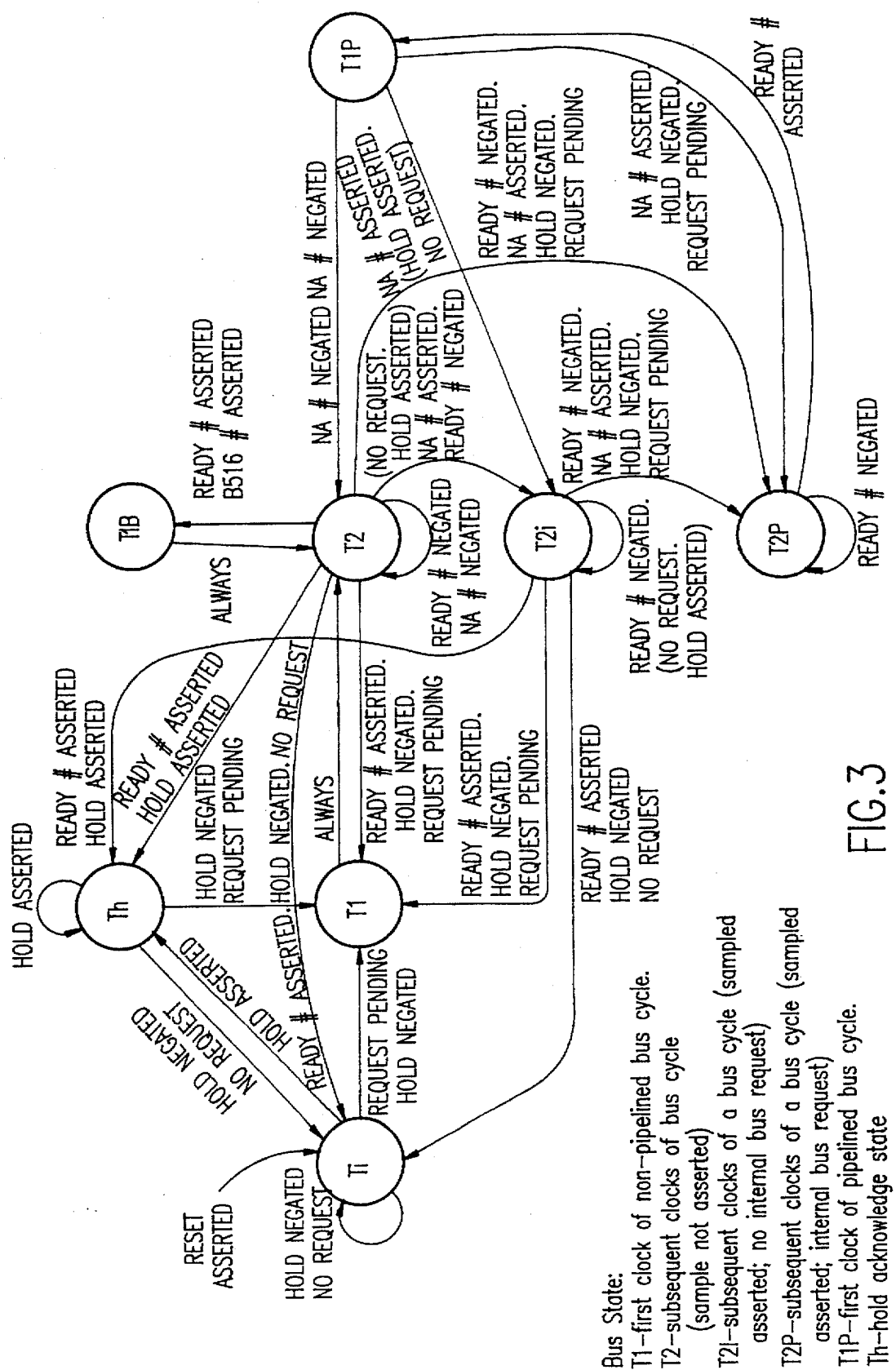
FIG. 3 is a diagrammatical representation of the state diagram of the replaced processor usable with the process of the present invention.

The handshaking protocol interface between pseudo state machines A and B will now be described in greater detail with reference to FIGS. 2 and 3, which illustrate bubble type state diagrams representing state machines. FIG. 2 depicts the state diagram of state machine A, which is a mirror of the upgraded 80486 microprocessor's bus state machine, while FIG. 3 shows the state diagram of state machine B of a 80386 microprocessor.

In order to control a process you must know where in the process you are and what you would like to do next. This is what is depicted in the state diagrams. Each bubble or circle represents a "state" or a place you can be. Typically, at each clock cycle one must make a state transition, that is, a move to another state or a loop back to the existing state. Each line of the state diagram represents a state transition path and the labels attached to these directed lines are the signal or logic requirements needed to take the particular path.

Each state typically has multiple paths, either in the form of inputs and outputs to other states, or paths that loop back to the same state. The loop path is essentially a wait state until the next state transition cycle. Certain common rules apply. All state transition requirements must be satisfied in order for the transition path to be taken. In addition, all the requirements for all the paths out of each state must be mutually exclusive. That is, you cannot transition to two different states or you cannot be in two states at one time.

For example, with reference to FIG. 2, state TWFF shows a loop path. This path is taken if signal $BC_{13}$ FF is high or true. Note that the other paths (from TWFF to TI and from TWFF to TW2P) out of state TWFF have the requirement that BC_FF be low or false (represented by the "/" in front of the signal/BC_FF). The path to TI is taken if B_ADSN is high, otherwise the path to TW2P is taken.

The handshake control signals of interest are B_ADSN and B_READYN in FIG. 2 for state machine A, and REQUEST and READY# in FIG. 3 for state machine B.

With reference to FIG. 2, B_ADSN is the input from the processor 20 that requests bus activity. This is shown as the transition from the idle state TI to either TR2 or TW2. TR2 represents a read cycle whereby access to memory is requested (path TI-TR2) and data is returned (path TR2-TI). TW2 represents a write cycle. In the write cycle, after access to memory is requested (path TI-TW2), you are automatically returned to state TI since no return data is generated. This automatic return allows the faster processor to continue processing without waiting for the slower system bus.

The second signal, B_READYN, is the return signal generated from state machine B. This signal is shown being used as you transition back from TR2 to TI. B_READYN is an asynchronous signal that is synchronized in a conventional manner to eliminate metastability problems.

One way to eliminate the metastability problem is through the use of clocked D flip-flops. In a D flip-flop, the output is equal to the value of the stored state inside the element. The output of a flip-flop changes only on a clock edge, and the flip-flop may be designed for either a rising (positive) or falling (negative) clock edge.

Because the D (data) input of the flip-flop is sampled on the clock edge, it must be valid for a period of time immediately before and after the clock edge. The inputs to the flip-flop, therefore, must be valid during a window that begins at set-up (i.e., the minimum time before the clock edge) and ends at the hold time (i.e., the minimum time after the clock edge).

In the context of the invention, if an asynchronous signal is transitioning between a high and low, and is thus not stable for the required set-up and hold times, the flip-flop may go into a metastable state. In such a state, the output will not have a legitimate high or low value, but will be in the indeterminate region between them. Some logic blocks that look at the output of the flip-flop may see its output as "0", while others may see it as "1".

One solution is to wait long enough before looking at the output of the flip-flop to ensure that its output is stable. This would involve waiting for a period that is typically several times longer than the set-up time.

Figure 4:
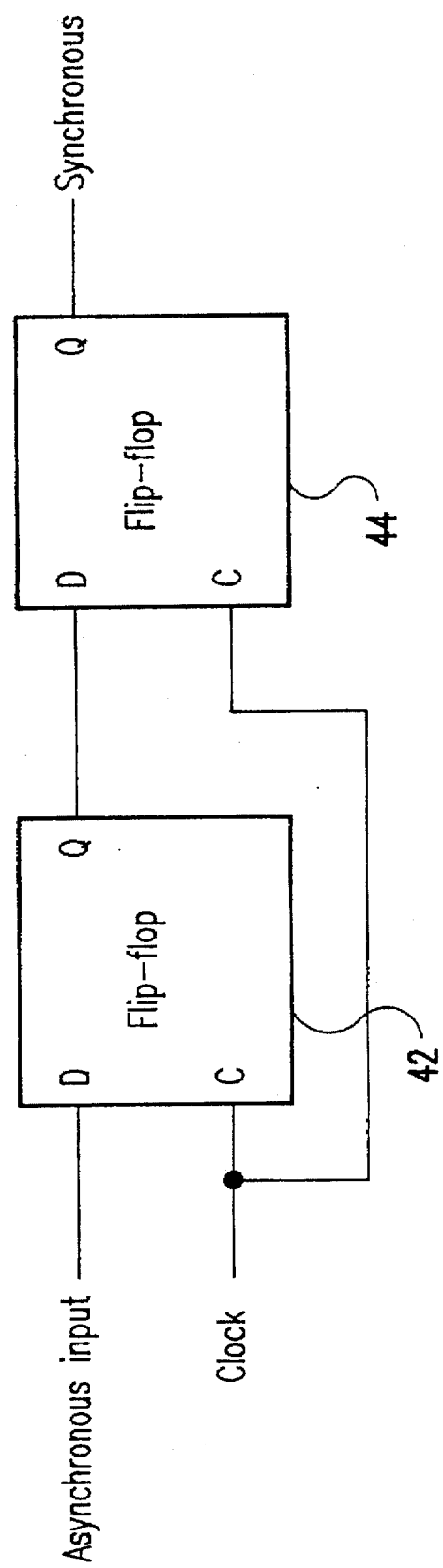
FIG. 4 is logic diagram of clocked flip-flops for use with the asynchronous signals of the present invention.

An exemplary embodiment for achieving a stable synchronous output with an asynchronous input is shown in FIG. 4. As shown in FIG. 4, although the output of the first D flip-flop 42 may be metastable, it will not be seen by any other logic element until the second clock, when the second D flip-flop 44 samples the signal, which should provide sufficient time to ensure that the signal is no longer in a metastable state.

Referring now to the second state machine B diagram of FIG. 3, REQUEST and READY# are the respective asynchronous hand shake signals from and to state machine A. The REQUEST signal may also have been stabilized in a manner similar to that discussed above with respect $B_{13}$READYN and FIG. 4.

These two signals, along with some other system control signals, determine the state transitions of state machine B. The other system control signals would be READY#, HOLD, and NA#. READY# is the control signal from the system state machine 32 signifying that is has accepted data or is ready to send data. HOLD is a request from the system state machine 32 to acquire bus B for a transaction between it and another bus user. Essentially HOLD is a request for state machine B to exit bus B. NA# is a control signal from the system state machine 32 that indicates to state machine B that it is ready to accept a second request from state machine B while it is acquiring the data to finish the first transaction.

One transition that can occur assumes state machine system B in state Ti (idle state) with the HOLD signal 'high', indicating that another device in the system is in control of the system bus and all other devices are deasserted. If the REQUEST signal from state machine A is 'low', then on the next system B clock, state machine B will go to the Th state (hold acknowledge state).

State machine B will stay in that Th state until HOLD goes 'low'. When HOLD goes 'low', and if the REQUEST signal from state machine A is 'high' then state machine B will go to the T1 state (first clock of a non-pipelined bus cycle). Note that state machine A is still able to run while state machine B is in a hold state.

If REQUEST from state machine A was 'low' when HOLD went 'low', then state machine B will go to the Ti state and wait until either HOLD or REQUEST go active.

With state machine B in the Ti state, if REQUEST is 'high' while HOLD is 'low', it will cause a transition to state T1. This means that a valid cycle has been initiated from state machine A. State machine B logic generates a signal to system state machine 32 during the T1 cycle indicating that information is valid on bus B. The system logic looks at the information on the bus B to determine if the cycle is a write or read cycle.

Assuming a write cycle, the next clock causes an automatic transition to the T2 state. State T2 indicates that the cycle data is valid on bus B. The system state machine 32 would then control the actual writing of data to a storage device at this time.

If it takes longer than one clock cycle to do this, system state machine 32 will leave READY# 'high' and state machine B will stay in the T2 state. This READY# signal is an input from system state machine 32 to state machine B. It is then sent to state machine A from state machine B.

When system state machine 32 completes the data store, state machine B will see READY# as 'low'. This indicates that the store is done and the next cycle can begin. If the REQUEST signal state machine A is 'low', state machine B goes to state Ti. If the REQUEST line is 'high', state machine B goes to T1 and another cycle starts.

The concept of inverse or mirrored processors will now be described. As noted in the above discussion, FIG. 2 is the "mirror" of the 80486 microprocessor's bus state machine while FIG. 3 is a duplicate of the bus state machine for the 80386 microprocessor. Typically the state diagram for an existing system as in FIG. 3 is available to create the pseudo state machine, which is merely a copy of the existing state diagram. With a new processor, however, the state diagram may not be readily available. Therefore, one may have to create a "mirror" state diagram of the new processor's state machine.

The problem with creating a replica of the internal state machine of the processor is that one is not normally able to view all of the inputs to the processor state machine since it is internal to the processor. You are only able to determine its operation by the outputs of the processor state machine. For example, an output could be a request for reading or writing data. If one were able to view all of the inputs to the processor state machine, then an exact duplicate of the state machine could be made and used to track the bus operations.

However, since only the outputs of the state machine are visible, and if the internal state of the processor state machine can change when those outputs are visible externally, then the processor state can only be determined after the fact. This creates a problem of generating a state machine that responds to the output of the processor state machine.

In the present invention, a so-called "mirrored" processor replicates the state transitions without having knowledge of the original inputs. The "mirrored" processor is created by having states which indicate where the processor state machine may be or may go to. Each transaction in the processor state machine or possible path must have a corresponding path or state in the system or mirrored state machine. One can create a state machine diagram of the mirrored state machine by using the outputs of the processor state machine as the enabling factors for a transition between states in the new state machine.

A new state is created for every possible output transaction. The difficulty in the design of the mirrored state machine is in the simplification of the diagram to that of one of the fewest states to enable a real world implementation of the new system or mirrored state machine.

It is understood that the state diagrams of FIGS. 2 and 3 are implementation dependent. Many different state machines may be constructed and used in practicing the present inventive method. It is also apparent that one of ordinary skill in the art would understand that conventional logic circuitry may be employed to achieve the respective state diagram flows.

While the invention has been described in terms of the embodiments described above, those skilled in the art will recognize that the invention can be practiced with modification within the spirit and scope of the appended claims.

Having thus described my invention, what we claim as new and desire to secure by Letters Patent is as follows:

1. A bus interface system in communication with first and second computer components, comprising:
   a first bus associated with said first component, said first bus having a first characteristic speed, data width, and protocol;
   a second bus associated with said second component, said second bus having a second characteristic speed, data width, and protocol, wherein at least one of said second characteristics is different from said first characteristics;
   a first state machine communicating with said first bus, the first state machine being a mirror of a state machine of the first component;
   a second state machine communicating with said second bus; and
   data storage means associated with said first and second buses, said first and second state machines being in selective communication using an asynchronous handshaking protocol, whereby data is transferred between said first and second buses.

2. A system as in claim 1, wherein the second state machine is a mirror of a state machine of the second component.

3. A system as in claim 2, wherein the handshaking protocol comprises means for producing an asynchronous request signal requesting a data transfer in a format comprising said first characteristics, and means for producing an asynchronous reply signal in a format comprising said second characteristics indicating that data has been sent or is available.

4. In a computer system having a first bus having a first characteristic speed, data width, and protocol, and a second bus having a second characteristic speed, data width, and protocol, wherein at least one of said second characteristics is different than said first characteristics, a method of asynchronous dual bus conversion using first and second pseudo state machines, the method comprising the steps of:
   storing data to be transferred in a data storage means;
   initiating an asynchronous request signal by the first pseudo state machine in communication with a first state machine through the first bus, said first pseudo state machine being a mirror of said first state machine, said asynchronous request signal having a format comprising said first characteristics, thereby requesting that data in the data storage means be transferred; and
   initiating an asynchronous reply signal by the second pseudo state machine in communication with a second state machine through the second bus, said asynchronous reply signal having a format comprising said second characteristics, thereby signalling that the data has been sent or is available.

5. An interface device for coupling a first state machine with a second state machine, said first state machine having a first characteristic speed, data width and protocol, said second state machine having a second characteristic speed, data width and protocol, at least one said second characteristic being different than one said first characteristic, said interface device comprising:
   a first pseudo state machine for communicating with said first state machine, said first pseudo state machine determining the state of said first state machine and entering a state responsive to the determined state of said first state machine; and
   a second pseudo state machine for communicating with said second state machine and with said first pseudo state machine, said second pseudo state machine determining the state of said second state machine and entering a state responsive to the determined state of said second state machine, whereby said first state machine communicates with said second state machine.

6. The interface device of claim 5 wherein said interface device is a CPU interface, said first state machine is a microprocessor and said second state machine is a computer system, the second pseudo state machine being connectable to a bus of said computer system.

7. The CPU interface of claim 6 wherein the microprocessor speed is greater than the bus speed.

8. The CPU interface of claim 6 wherein the microprocessor data width is wider than that of the bus.

9. The CPU interface of claim 8 wherein the microprocessor data width is twice that of the bus.

10. The CPU interface of claim 9 wherein the microprocessor is a first microprocessor and the bus is a microprocessor bus for a second microprocessor, the first microprocessor speed being greater than the second microprocessor speed.

11. A CPU assembly comprising:
    a microprocessor, said microprocessor being a processor state machine and having a characteristic speed, data width and protocol;
    data storage means associated with said microprocessor;
    a first pseudo state machine mirroring said processor state machine and communicating with said microprocessor and said data storage means; and a second pseudo state machine communicating with said first pseudo state machine and coupling said first pseudo state machine to a bus, said bus having a characteristic speed, data width and protocol, at least one said bus characteristic being different than said microprocessor's characteristics, whereby data is transferred between said microprocessor and said bus.

12. The CPU assembly of claim 11 wherein the microprocessor speed is greater than the bus speed.

13. The CPU assembly of claim 11 wherein the microprocessor data width is wider than that of the bus.

14. The CPU assembly of claim 13 wherein the microprocessor data width is twice that of the bus.

15. The CPU assembly of claim 14 wherein the microprocessor speed is greater than the bus speed.

* * * * *